United States Patent
Luckenbaugh et al.

(10) Patent No.: US 12,516,427 B2
(45) Date of Patent: Jan. 6, 2026

(54) DISSOLVABLE ENGINEERED COMPONENTS UTILIZING NANOGALVANIC ALLOYS

(71) Applicant: U.S. Army DEVCOM Army Research Laboratory, Adelphi, MD (US)

(72) Inventors: Thomas L Luckenbaugh, Spring Grove, PA (US); Anthony J. Roberts, Chesapeake City, MD (US); Billy C. Hornbuckle, Bel Air, MD (US); Anit K. Giri, Abingdon, MD (US); Kristopher A. Darling, Havre de Grace, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 743 days.

(21) Appl. No.: 17/684,540

(22) Filed: Mar. 2, 2022

(65) Prior Publication Data

US 2023/0279565 A1 Sep. 7, 2023

(51) Int. Cl.
C22C 21/00 (2006.01)
C25B 1/04 (2021.01)
C25B 11/037 (2021.01)
C25B 11/046 (2021.01)

(52) U.S. Cl.
CPC ............ *C25B 11/037* (2021.01); *C22C 21/00* (2013.01); *C25B 1/04* (2013.01); *C25B 11/046* (2021.01)

(58) Field of Classification Search
CPC ....... C25B 11/037; C25B 1/04; C25B 11/046; C25B 5/00; C25B 9/40; C22C 21/00
See application file for complete search history.

(56) References Cited

U.S. PATENT DOCUMENTS

2019/0024216 A1* 1/2019 Giri ...................... C25B 5/00
2020/0024689 A1 1/2020 Giri et al.

* cited by examiner

*Primary Examiner* — Jessee R Roe
(74) *Attorney, Agent, or Firm* — Christos S. Kyriakou

(57) ABSTRACT

A dissolvable engineered component fabricated using an aluminum-based nanogalvanic alloy and a method of manufacturing such a dissolvable engineered component.

7 Claims, 6 Drawing Sheets

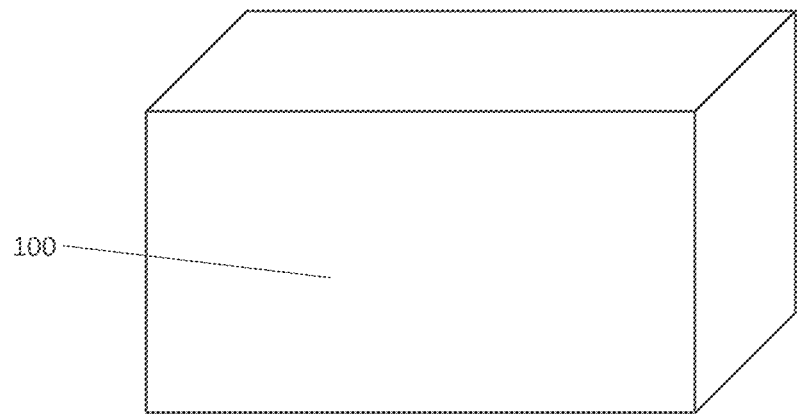
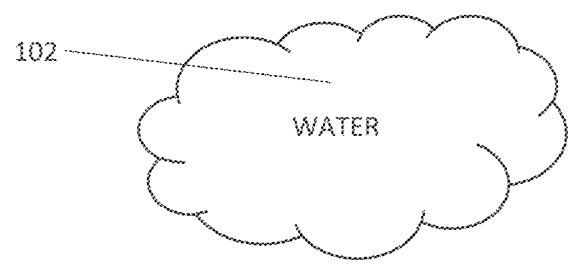
FIG. 1
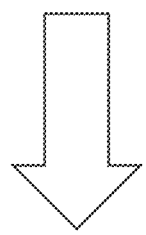
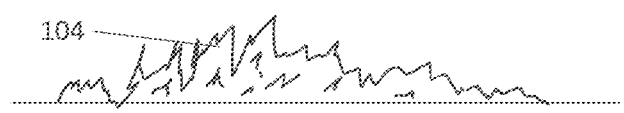

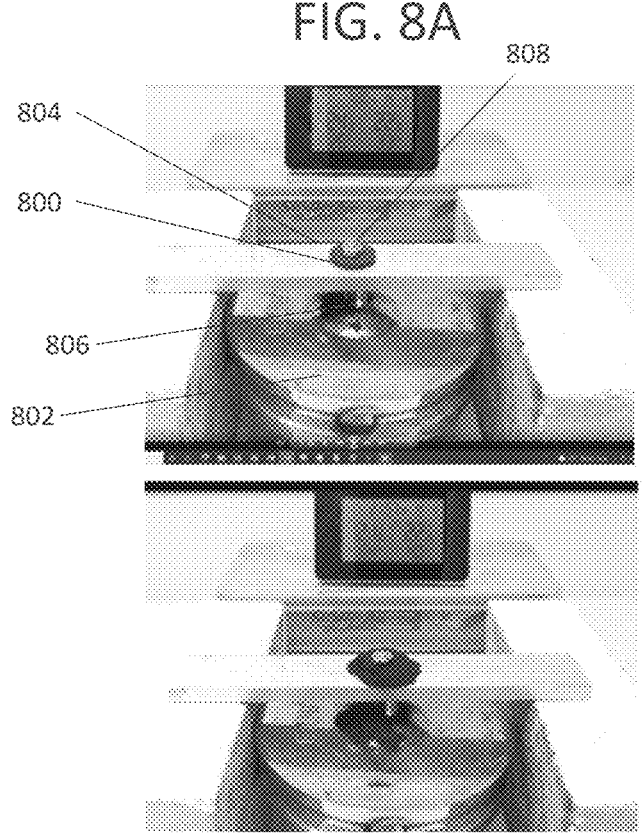
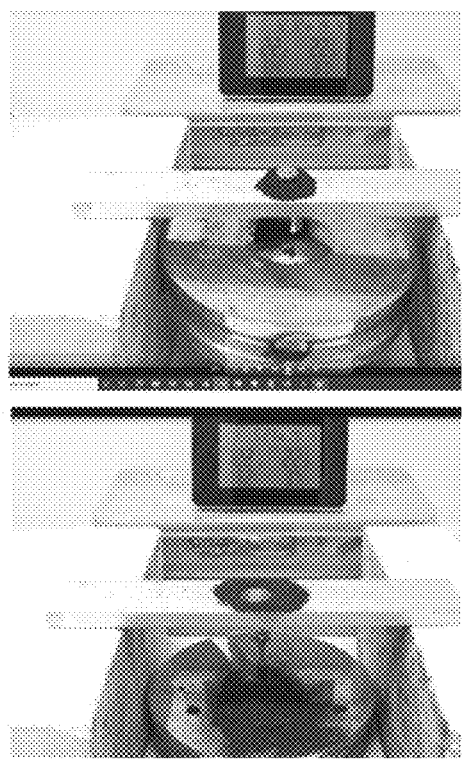
FIG. 8A
FIG. 8B
FIG. 8C
FIG. 8D

DISSOLVABLE ENGINEERED COMPONENTS UTILIZING NANOGALVANIC ALLOYS

GOVERNMENT INTEREST

The invention described herein may be manufactured, used and licensed by or for the U.S. Government.

BACKGROUND

Field

Embodiments of the present invention generally relate to nanogalvanic alloys and, more specifically, to a dissolvable engineered components utilizing nanogalvanic alloys.

Description of the Related Art

Nanogalvanic alloys, especially aluminum-based nanogalvanic alloys, are characterized by their galvanic microstructure, which comprises an anodic matrix consisting of aluminum, an aluminum alloy, and a cathodic dispersed phase of another metal composition. These other metals may comprise tin, magnesium, silicon, bismuth, lead, gallium, indium, zinc, carbon, or a mixture of these metals. These alloys produce hydrogen gas when the cathodic disperse phase forms galvanic couples with the anodic matrix and the resulting galvanic metal microstructure comes in contact with water or any liquid containing water. The nanostructured galvanic couple, with aluminum as the anode and the other metal element as the cathode, rapidly disturbs the formation of the native oxide layer and continually exposes fresh aluminum surfaces to hydrolysis.

The hydrogen produced by combining nanogalvanic alloys with liquid water may be coupled to a fuel cell to form a power supply to produce electrical energy. The production of aluminum-based nanogalvanic alloys for use in generating hydrogen is described in commonly assigned US patent publication number 2020/0024689, filed 23 Jul. 2018, entitled "Aluminum Based Nanogalvanic Compositions Useful for Generating Hydrogen Gas and Low Temperature Processing Thereof," (referred to herein as the '689 patent publication) which is hereby incorporated herein by reference in its entirety.

Heretofore, the focus of research has been on the use of nanogalvanic materials for hydrogen production. There has been no known effort to utilize nanogalvanic alloys in engineered components such that, upon application of a liquid comprising water, the component dissolves.

SUMMARY

Embodiments of the present invention include a dissolvable engineered components utilizing nanogalvanic alloys in accordance with the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawing. It is to be noted, however, that the appended drawing illustrates only a typical embodiment of this invention and is therefore not to be considered limiting of its scope, for the invention may admit to other equally effective embodiments.

FIG. 1 depicts a dissolvable engineered component in the form of a box-shaped enclosure fabricated using at least one nanogalvanic alloy and a process by which the component is dissolved in accordance with an embodiment of the present invention;

FIGS. 8A, B, C and D are a sequence of photographs of an example of a dissolvable engineered component (disc) made using at least one nanogalvanic alloy and being dissolved in water in accordance with at least one embodiment of the invention.

DETAILED DESCRIPTION

Figure 2:
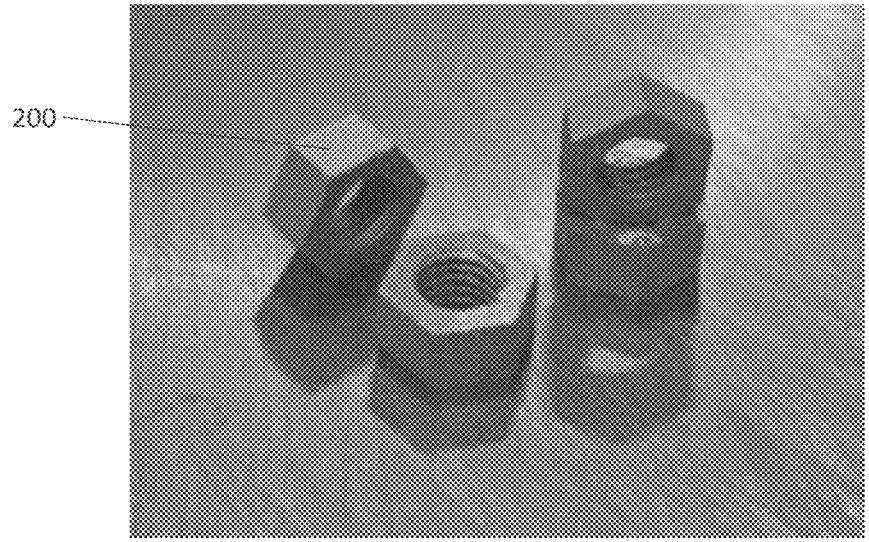
FIG. 2 is a photograph of an example of a dissolvable engineered component (⅝-11 hex nuts) made using at least one nanogalvanic alloy.

Embodiments of the present invention include dissolvable engineered components utilizing nanogalvanic alloys. These components may be structural in nature or non-load bearing. The engineered components are structurally useful objects, i.e., they have an intended purpose such as an enclosure, fastener, substrate, coating, etc. When the engineered component "dissolves," the component loses physical integrity and disintegrates such that the component no longer performs its intended purpose. These components may be fully fabricated using only nanogalvanic aluminum-based powders or incorporated with other substances in a prescribed mixture. The mixture may contain substances that control (i.e., accelerate or slow-down) aspects of a component's dissolvability.

The production of aluminum-based nanogalvanic alloys for use in generating hydrogen is described in commonly assigned US patent publication number 2020/0024689, filed 23 Jul. 2018, entitled "Aluminum Based Nanogalvanic Compositions Useful for Generating Hydrogen Gas and Low Temperature Processing Thereof," (the '689 patent publication) which is hereby incorporated herein by reference in its entirety. The '689 patent publication describes alloys comprised of a refined microstructure, ultrafine or nano scaled, that when reacted with water or any liquid containing water will spontaneously and rapidly produce hydrogen gas at ambient or elevated temperature. These metals, termed here as aluminum-based nanogalvanic alloys have applications that include, but are not limited to, energy generation on demand. The alloys may be composed of primarily aluminum and other metals, e.g., tin bismuth, indium, gallium, lead, etc. and/or carbon, and mixtures and alloys thereof. The alloys may be processed by ball milling for the purpose of synthesizing powder feed stocks, in which each powder particle will have the above-mentioned characteristics. These powders can be used in their inherent form or consolidated using commercially available techniques for the purpose of manufacturing useful functional components.

Embodiments of the present invention pertain to the utilization of nanogalvanic aluminum-based alloys in consolidated form to created engineered components, e.g., structures or portions of structures such as substrates, enclosures, coatings, and the like. When such components are exposed to water or water vapor, the component dissolves, loses physical integrity and releases hydrogen gas.

In one embodiment, the component spontaneously dissolves by reacting the alloy with liquid water or an aqueous solution. In another embodiment, the component spontaneously dissolves by reacting the alloy with natural or engineered atmospheric humidity. Atmospheric humidity is a measure of the amount of water vapor or moisture in the air. This includes heated steam, i.e., the vapor into which water is converted when heated, forming a white mist of minute water droplets in the air or undercooled vapor such as fog, mist, haze, i.e., a visible mass of condensed water vapor suspended in the atmosphere which may or may not be heated, or some mixture of water vapor with another chemically distinct form of vapor or other phase. Engineered atmospheric humidity specifies the use of, but not limited to: mechanical, thermal, acoustic, ultrasonic, photonics, electromagnetic radiation, radiation and magnetic energy to form suspended water vapor. Suspended refers to being airborne for some undefined amount of time.

In an exemplary embodiment described with reference to FIG. 1 below, a box-like enclosure structure is fabricated using at least one aluminum-based nanogalvanic alloy. When the box is exposed to any form of water, the water reacts with the alloy and dissolves the structure. In other components, the structure may be a key component of a weapon, communication system, commercial product that is required to made inoperable either after a period of time or on demand. Embodiments of the invention may be used to create a self-destruction mechanism where water is applied to a critical component to immediately dissolve the component or, over time, water vapor dissolves a component until the dissolution renders the system inoperable. The time and/or the amount of water required to dissolve a component is controlled using at least one additive within the galvanic material.

Various two-part epoxies and resins mixed with Aluminum Bismuth (AlBi) powder have been used to create structural components such as nuts, bolts and simple mechanical items. Methodology has consisted of mixing AlBi powder with activated resin or epoxy in concentrations that still allow for pouring and/or molding into, for example, room temperature vulcanizing (RTV) silicone molds. The maximum concentration of AlBi to resin/epoxy has been determined to be approximately 95% AlBi by weight. The amount of resin or epoxy within the component controls the time required for the component to dissolve when exposed to water. Lower viscosity resins may provide higher AlBi to resin mixing ratios. Complete dissolution or failure occurs at ratios as low as approximately 5% AlBi to resin/epoxy. In various embodiments, BCC Products BC-8165 two-part urethane casting resin have been used. In other embodiments, DEVCON two-part 5-Minute epoxy, Forsch Polymer 40A and Bondo 402 Fiberglass resin have also been used.

FIG. 1 depicts a dissolvable engineered component 100 in the form of a box-shaped enclosure fabricated using at least one nanogalvanic alloy and a process by which the component is dissolved in accordance with an embodiment of the present invention. The component 100 (or portion thereof) is fabricated through engineering an aluminum-based nanogalvanic powder into a shape as described in more detail below. The component 100, in the depicted embodiment, a box-like enclosure, is exposed to water, water vapor or an aqueous solution (in liquid or vapor state) as shown at 102. Upon contact, the water hydrolyzes the alloy to dissolve the alloy and return the component 100 to a powder 104. As such, the component 100, when exposed to water, loses its physical integrity.

The component 100 may be structural or non-load bearing. The component may be fabricated from a combination of alloys. In other embodiments, additives may be included in the alloy mixture to alter the structural properties of the component, i.e., harder, softer, malleable, strength, density, and the like. In other embodiments, additives may be used to control the rate of component dissolution.

In one exemplary embodiment, a dissolvable engineered component may be fabricated from a solder or brazing material having a low melting point, e.g., less than the melting point of aluminum (about 660 degrees Celsius). Such materials include low melting point or "fusible" alloys (such as Belmont CAST metal #2405, and Belmont TRU Alloy #2581) that are mechanically mixed with the aluminum bismuth (AlBi) powder. AlBi powder is stir-mixed with the molten alloys at concentrations up to 25% by weight. This mixture is pressed while still in a semi-liquid state into 1 inch diameter discs at approximately 1 GPa force. Complete dissolution occurs up to the concentrations mentioned. For example, at a 20% AlBi to 80% molten metal mixture, dissolution occurs at a rate of approximately 0.20 grams per minute in ordinary tap water at room temperature. Higher concentrations of AlBi to fusible alloy may be used. Concentrations containing as low as 5% AlBi have been successfully dissolved. Materials with higher melting points and higher strengths may also be used. It should be noted here that the solder or brazing materials by themselves are not self-dissolving. However, when mixed with nanogalvanic powder the resultant component by virtue of the nanogalvanic powder becomes dissolvable or disintegrates. The same is true for the above case in which resins or other polymers are used to fabricate components.

The dissolvable component may be manufactured as a single component or an assembly, where such assembly may include one or more dissolvable components. Additive manufacturing techniques may be used to fabricate dissolvable structures in accordance with various embodiments of the invention. Manufacturing techniques that may be used to manufacture the dissolvable component include, but are not limited to, three-dimensional (3D) printing, fused filament fabrication, cold/thermal spray, friction stir weld processing, or other conventional methods of powder consolidation to include, but are not limited to: hot isostatic pressing, cold isostatic pressing, open die pressing, powder injection molding, extrusion, forging, rolling, and the like.

Furthermore, fabrication of dissolvable/self-destructing engineered components from nanogalvanic aluminum-based alloys may be accomplished by several, but not limited to, conventional powder compaction methods. Uniaxial pressing has been used to produce geometric shapes with varying densities and green strengths. Cold isostatic pressing has also been used to make cylindrical shapes and rods that are able to be threaded, e.g., dissolvable bolts, screws and rivets. Cast, flexible molds may be used to fabricate complex components. Low temperature sintering may be used in conjunction with each of these compaction techniques to fabricate dissolvable components.

In one embodiment, to dissolve the component, liquid water may be poured onto the component. In other embodiments, the component may be dissolved when exposed to other sources of water including, but not limited to, rain, stream, river, pond, lake, sewer, ocean, and the like. If the component is a key component of a larger system, the system may be rendered inoperable after the component has been dissolved. In other embodiments, a water or aqueous solution source (liquid or vapor) may be activated to apply water to dissolve the component, i.e., to self-destruct the component.

In one exemplary embodiment, the activatable water source comprises a water or aqueous solution source, e.g., conduit (water pipe), bottle, bladder, etc. for supplying water or other aqueous solution to a vapor producing device. The vapor producing device may utilize, but not limited to, mechanical, thermal, acoustic, ultrasonic, photonics, electromagnetic radiation, radiation and magnetic energy to form suspended water vapor. For example, an ultrasonic vaporizer comprising a piezoelectric transducer (not shown) that vibrates at about 1-2 MHz to vaporize water that contacts the transducer. A controller may apply power to the device to control activation to select a time and/or place for activation and dissolution of the component. Activation may occur when an operator desires to disable a system containing the component, i.e., a self-destruct mechanism. Activation may occur from a local signal (e.g., operator locally depresses a button) or remotely via a wireless connection (e.g., WIFI, Bluetooth, satellite, etc.).

In other embodiments, the water vapor source may be atmospheric water vapor, i.e., humid air, that is channeled into proximity of the dissolvable component. In one embodiment, humidity of the atmospheric water vapor need only be 60% or more to contain sufficient water vapor to create and maintain a hydrolysis reaction with a nanogalvanic alloy and result in dissolution of the component.

The dissolvable component may be a sub-component of a larger system such that dissolving the component renders the system inoperable. Such systems include, but are not limited to, vehicles having dissolvable ignition components, weapons having dissolvable trigger assembly components or dissolvable detonation components, communications systems with dissolvable transmission or reception components, machines with dissolvable bolts, screws or rivets, and the like. Generally, any component that can be fabricated from aluminum may be fabricated from aluminum-based nanogalvanic alloys and become a dissolvable component.

FIG. 2 is a photograph of an example of a dissolvable engineered component (⅝-11 hex nuts 200) made using at least one nanogalvanic alloy. In one embodiment, the hex nuts 200 are made from 50% AlBi Nanogalvanic Aluminum Powder mixed with 50% (by weight) BCC two-part resin. The mixture is molded in an RTV Silicon mold and pressure cast under Argon at 30 psi.

Figure 3:
FIG. 3 is a photograph of an example of a dissolvable engineered component (⅝-11 hex bolts) made using at least one nanogalvanic alloy.

FIG. 3 is a photograph of an example of a dissolvable engineered component (⅝-11 hex bolts 300) made using at least one nanogalvanic alloy. In one embodiment, the bolts 300 are made from 50% AlBi Nanogalvanic Aluminum Powder mixed with 50% (by weight) BCC two-part resin. The mixture is molded in an RTV Silicon mold and pressure cast under Argon at 30 psi.

Figure 4:
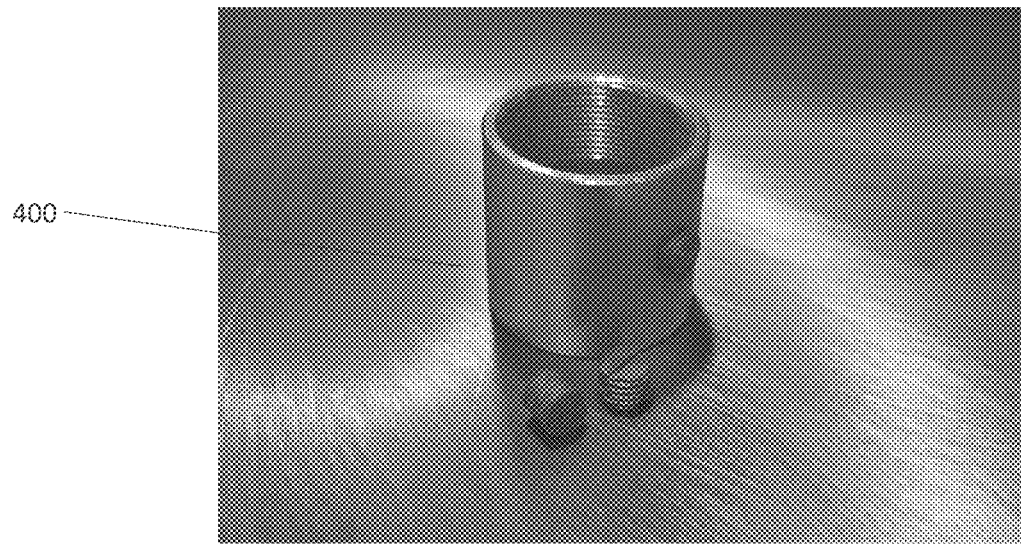
FIG. 4 is a photograph of an example of a dissolvable engineered component (threaded seal) made using at least one nanogalvanic alloy.
Figure 5:
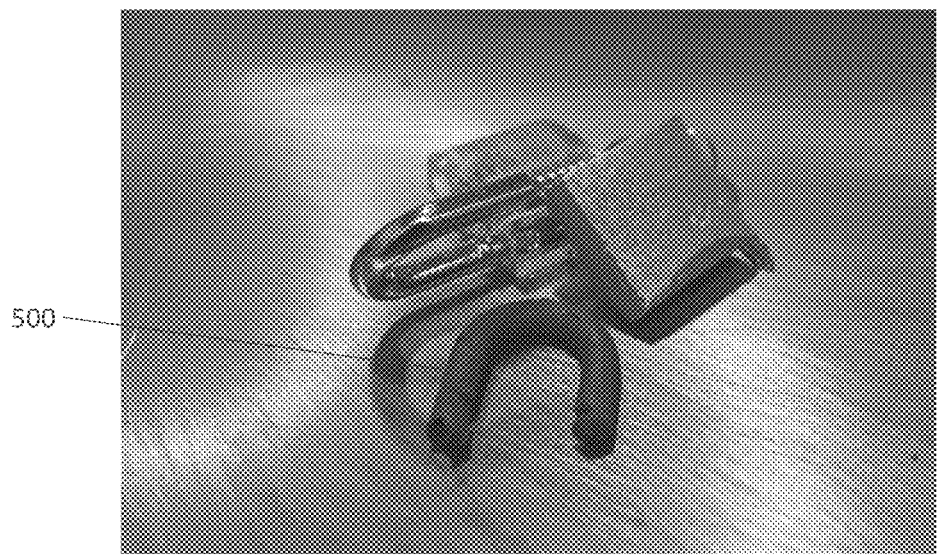
FIG. 5 is a photograph of an example of a dissolvable engineered component (padlock components) made using at least one nanogalvanic alloy.

FIG. 4 is a photograph of an example of a dissolvable engineered component (threaded seal 400) made using at least one nanogalvanic alloy. In at least one embodiment, the seal 400 comprises 50% AlBi Nanogalvanic Aluminum Powder mixed with 50% BCC two-part resin. The mixture is molded in an RTV Silicon mold and pressure cast under Argon at 30 psi. When sealed at both ends, this component is intended to seal a vessel from moisture entering from the outside to temporarily protect the contents inside, conversely it could also be used to temporarily retain a moisture-containing substance from escaping to the outside environment FIG. 5 is a photograph of an example of a dissolvable engineered component (padlock components 500) made using at least one nanogalvanic alloy. In one embodiment, one or more padlock components are made from 50% AlBi Nanogalvanic Aluminum Powder mixed with 50% BCC two-part resin. The mixture is molded in a two-piece, separable, plaster mold and pressure cast under Argon at 30 psi. The padlock functions as a normal padlock until moisture causes it to fail.

Figure 6:
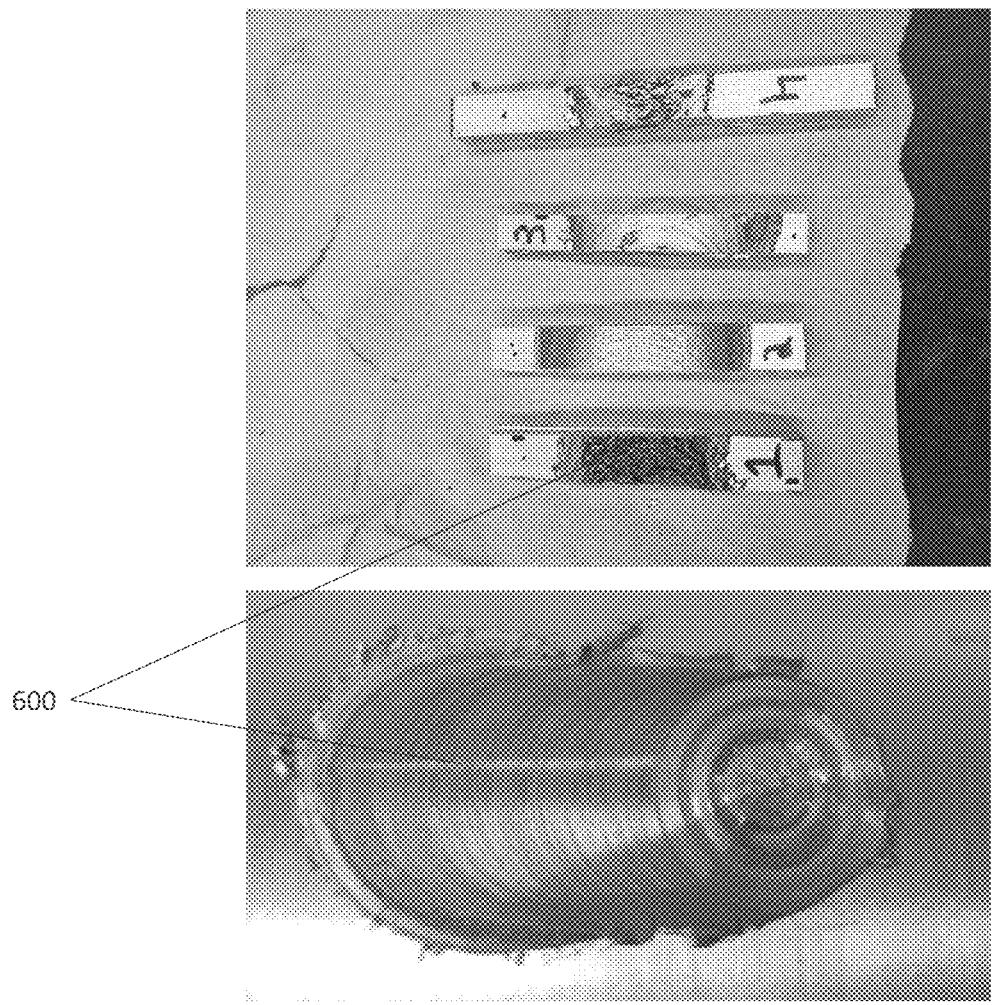
FIG. 6 is a photograph of an example of a dissolvable engineered component (structural weld) made using at least one nanogalvanic alloy.

FIG. 6 is a photograph of an example of a dissolvable engineered component (structural weld 600) made using at least one nanogalvanic alloy. These samples show a top down view of Nanogalvanic Aluminum Tin (AlSn) alloy used to create a weld joining two pieces of Al alloy using a MELD process. In one embodiment, solid rods created from AlSn powder are fed into the MELD machine to make these structural joints. The MELD process can also be used to deposit thick fully dense coatings or layers of Nanogalvanic AlSn the surface of other metals. Both the welds and/or coatings form dissolvable structures.

Figure 7A:
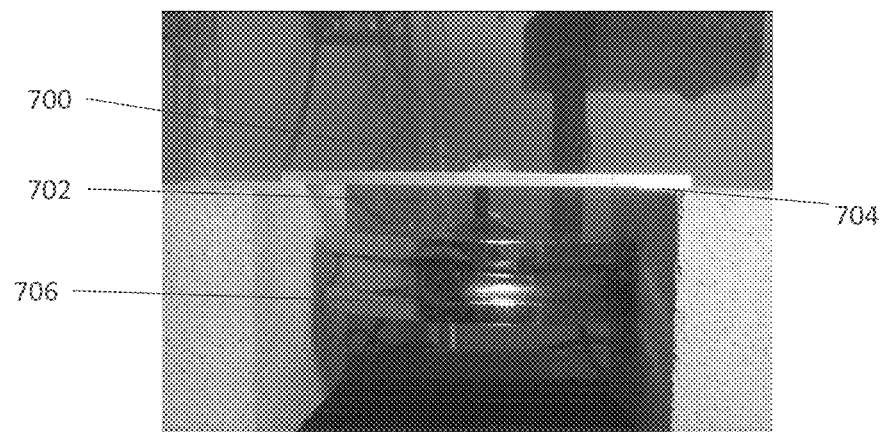
FIGS. 7A, B and C are a sequence of photographs of an example of a dissolvable engineered component (⅝-11 hex nut) made using at least one nanogalvanic alloy and being dissolved in water in accordance with at least one embodiment of the invention.

FIGS. 7A, B and C are a sequence of photographs of an example of a dissolvable engineered component (⅝-11 hex nut 700) made using at least one nanogalvanic alloy and being dissolved in water in accordance with at least one embodiment of the invention. In one embodiment, the hex nut 700 is produced from 75% AlBi and 25% Polyethylene (PE) by weight. The PE is melted in an open air furnace and 75% AlBi Nanogalvanic powder is mixed into the PE. The warm mixture is then pressed under 50 tons of force in a uniaxial press to form a round disc. Subsequently, the disc is machined to form a hexagonal nut shape and tapped to create the threads.

In FIG. 7A, a bolt extends through a support 704 and is threaded into the nut 702. The bolt is attached to a weight 706 (e.g., 10 lbs) such that the nut supports the weight 606 below the support 704.

Figure 7B:
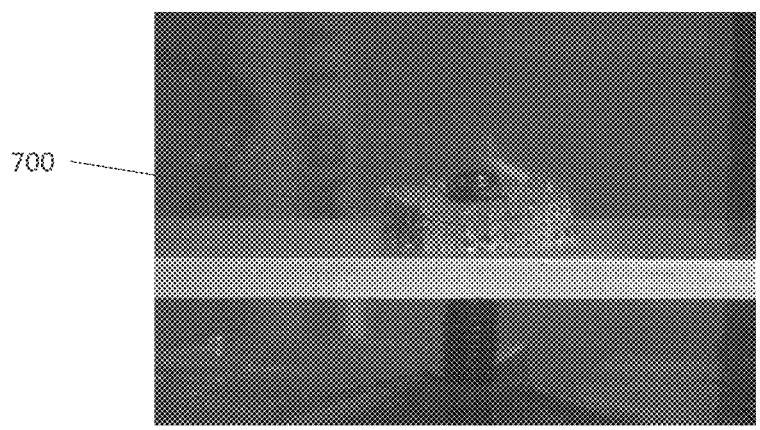
Figure 7C:

In FIG. 7B, water is applied to the nut 700. In FIG. 7C, the nut 700 has dissolved to a point where the weight causes the bolt to be stripped from the threads of the bolt. Total dissolution time was less than 6 minutes.

FIGS. 8A, B, C and D are a sequence of photographs of an example of a dissolvable engineered component (disc) made using at least one nanogalvanic alloy and being dissolved in water in accordance with at least one embodiment of the invention. In one embodiment, 5 grams of AlBi Nanogalvanic Powder is uniaxially pressed at 5 tons of force to form a disc 800. The disc 800 is drilled and attached to a weight 802 by a bolt 806 and nut 808 (i.e., the nut rests upon the disc 800 to support the weight 802 below support 804). The assembly was placed in open air to dissolve the disc 800 using ambient humidity. As shown in FIGS. 8B and 8C, when the disc 800 is exposed to a relative humidity of about 64%, total dissolution time was around 30 hours. As shown in FIG. 8D, upon dissolution, the weight 802 causes the nut 808 to fall through the support 804.

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g., one or more of A, B, and/or C), unless stated otherwise, it is understood to include one or more of each element, including any one or more combinations of any number of the enumerated elements (e.g., A, AB, AC, ABC, ABB, etc.). When "and/or" is used, it should be understood that the elements may be joined in the alternative or conjunctive.

While the foregoing is directed to embodiments of the present invention, other and further embodiments of the invention may be devised without departing from the basic scope thereof, and the scope thereof is determined by the claims that follow.

REFERENCE NUMERALS

ARL21-05
  100 component
  102 aqueous solution
  104 powder
  200 hex nuts
  300 hex bolts
  400 threaded seal
  500 components
  600 structural weld
  700 hex nut
  800 disc
  802 weight
  804 support
  806 bolt
  808 nut

The invention claimed is:

1. A system comprising:
   a structurally useful component formed of aluminum-based nanogalvanic alloy powder;
   a source of water, wherein, when the structurally useful component is contacted with water from the source of water, the structurally useful component dissolves
   wherein the water source uses mechanical, thermal, acoustic, ultrasonic, photonics, electromagnetic radiation, radiation and magnetic energy to form suspended water vapor proximate the structurally useful component to facilitate dissolution of the structurally useful component.

2. The system of claim 1, further comprising at least one additive within the aluminum-based nanogalvanic alloy to control a time required for the dissolvable component to dissolve.

3. The system of claim 2, wherein the at least one additive comprises at least one of a resin, epoxy, polymer, solder material, brazing material, or any metal having a lower melting point than aluminum.

4. The system of claim 1, further comprising additives within the aluminum-based nanogalvanic alloy to control the amount of water required for the dissolvable component to dissolve.

5. The system of claim 1, wherein the aluminum based nanogalvanic alloy powder contains substantially aluminum and at least one of tin, bismuth, indium, gallium, lead or carbon, and mixtures and alloys thereof.

6. The system of claim 1, wherein dissolution of the structurally useful component renders the system inoperable.

7. The system of claim 1, wherein water is selectively applied to the component to cause dissolution to occur at a particular time or place.

* * * * *